United States Patent Office 2,709,695
Patented May 31, 1955

2,709,695

HIGH-TEMPERATURE POLYMERIZATION OF UNSATURATED HYDROCARBON MIXTURES

Francis T. Wadsworth, Dickinson, Tex., assignor, by mesne assignments, to Pan American Refining Corporation, Texas City, Tex., a corporation of Texas No Drawing. Application July 27, 1951,
Serial No. 238,999

7 Claims. (Cl. 260—82)

This invention relates to synthetic resins and particularly to synthetic hydrocarbon resins. More specifically, my invention relates to the production of synthetic hydrocarbon resins from a mixture of unsaturated hydrocarbons obtained in the high-temperature pyrolysis of normally gaseous hydrocarbons.

It is well known that resins can be produced from unsaturated hydrocarbons by polymerization thereof in the presence or absence of various catalytic materials. It is also well known that unsaturated hydrocarbon mixtures suitable for the production of resins can be produced by the high-temperature pyrolysis of gaseous hydrocarbons, in which the hydrocarbons undergo a complex group of reactions, including cracking, dehydrogenation, conjugation, aromatization, polymerization, and the like, whereby the hydrocarbons are converted into a heterogeneous mixture comprising olefins, diolefins, cycloolefins, aromatics, and numerous other constituents of surprisingly diverse physical properties, extending from ethylene to solids of high melting point. This mixture of materials has been the subject of very extensive experimental work to prepare useful products therefrom, including pure aromatics, pure olefins and diolefins, and resins. The resins have in general been of limited utility, however, owing to their comparatively dark color, their color instability, and their tendency toward mechanical failure during aging. Moreover, the resins have exhibited little or no response to the usual methods of decolorizing, such as treatment with strong mineral acids or with adsorbent solids.

I have now discovered that stable resins of high susceptibility to decolorization and low iodine number can be prepared from certain unsaturated hydrocarbon mixtures and fractions thereof, obtained as hereinafter described by pyrolysis of normally gaseous hydrocarbons containing two or more carbon atoms in the molecule. My new resins are obtained by polymerizing an unsaturated hydrocarbon charging stock of the aforesaid class at a temperature above about 500° F. in the presence of a catalyst containing boron trifluoride as the essential constituent thereof. Light-colored resins of lighter than 5 Barrett color have been produced by subjecting the resulting polymer to a simple decolorization by clay or acid treatment.

One object of my invention is to prepare a hydrocarbon resin of improved chemical and physical properties. Another object is to prepare a hydrocarbon resin of improved susceptibility to decolorization. A further object is to prepare a hydrocarbon resin of low iodine number, lighter color, and improved stability. A still further object is to prepare a useful hydrocarbon resin from an unsaturated liquid mixture obtained in the pyrolysis of normally gaseous hydrocarbons. Another object is to minimize color formation during the separation of polymerization catalysts from hydrocarbon resins. Another object is to improve the decolorization of resins obtained by polymerizing unsaturated hydrocarbons in the presence of a boron trifluoride catalyst. Other objects of my invention and its advantages over the prior art will be apparent from the present description thereof and from the appended claims.

My process employs as the charging stock an unsaturated hydrocarbon liquid or fraction thereof commonly referred to as "Dripolene", which is obtained by high-temperature pyrolysis of a normally gaseous hydrocarbon containing two or more carbon atoms in the molecule, or a mixture of such hydrocarbons. The latter hydrocarbons are readily available in the form of natural gases and as by-product gases from the cracking of heavy petroleum oils in the manufacture of gasoline. In the preparation of Dripolene, a gaseous hydrocarbon or mixture of hydrocarbons, preferably propane, a mixture of propane and propylene, or a natural gas rich in propanes and/or butanes is preheated and passed through an alloy tube in a furnace, where it is exposed at high space velocity to a pyrolysis temperature of at least about 1300° F., preferably between about 1350 and 1550° F. Low pressures up to about 100 pounds per square inch are ordinarily employed in this operation, a pressure of 5 to 40 pounds per square inch gage at the outlet being satisfactory. It is important that the stream of gas be passed through the furnace at high velocity, so that the time of exposure to the high temperature is limited to about 0.2 to 5 seconds, around 1 second being preferred.

The hot gases leaving the furnace are immediately cooled below reaction temperature, preferably below about 100° F., by quenching with a stream of water, oil, or other cooling medium. Further pyrolysis, polymerization, or degradation of the reaction product is prevented in this way. From the quenching zone, the quenching liquid and a liquid mixture of unsaturated hydrocarbons are withdrawn, the latter being designated in the art as "Dripolene." The Dripolene is separated from the quenching liquid by stratification (where the two liquids are immiscible, as from water), or by distillation (as from an absorber oil). The quantity of liquid hydrocarbons produced in this way is ordinarily around 3 percent by weight of the total quantity of gas charged to the pyrolysis reactor, the remainder of the gas being converted to lower-molecular-weight hydrocarbons such as ethylene, methane, and hydrogen. A typical specimen of Dripolene has the following properties and composition:

ASTM distillation range, ° F.:
  Initial _____ 100
  10% _____ 146
  20 _____ 162
  30 _____ 178
  40 _____ 188
  50 _____ 196
  60 _____ 206
  70 _____ 234
  80 _____ 296
  90 _____ 340
  Final _____ 360
Gravity, ° API at 60° F. _____ 34.7
Bromine number, cg. $Br_2$/g. _____ 104.1
Maleic anhydride value, mg. M. A./g. _____ 79
Index of refraction, $n_D^{25}$ _____ 1.4830
Analysis, volume-percent:
  Propane and propylene _____ 0.7
  Isobutane _____ 0.1
  Isobutylene _____ 0.8
  1-butene _____ 0.5
  2-butene _____ 0.6
  n-Butane _____ 0.4
  Butadiene _____ 3.9
  Pentadienes _____ 7.7
  Pentylenes _____ 6.3
  Other $C_5$ _____ 0.4

| | |
|---|---|
| Benzene | 34.2 |
| Toluene | 7.8 |
| Xylenes | 1 |
| Styrene | 3 |
| Dicyclopentadiene | 5 |
| Other | 29.6 |

In the preparation of resins by my new process, I can employ the total Dripolene phase obtained as described above, or a distillate or bottoms fraction thereof. An especially desirable charging stock is a 70 to 90 percent Dripolene distillate fraction, such as the so-called "80 percent Dripolene overhead" fraction, obtained by fractionally distilling the total Dripolene and separating therefrom the desired proportion of the Dripolene as a distillate fraction. Other fractions can also be employed in the process of my invention, yielding resins of somewhat different characteristics.

As noted above, I have observed that Dripolene resins produced by polymerization around 350° F., the temperature heretofore employed in the art, do not respond to any of the conventional decolorization techniques, such as acid treating and clay filtering. My new resins are chiefly distinguished in that they do respond to such techniques. I have found, for example, that by treating Dripolene at 500 to 550° F. with as little as 0.5 percent by weight $BF_3$, resins are produced in a 30 to 35 percent by weight yield which respond to acid treating (5 to 15 pounds of 95 percent $H_2SO_4$ per barrel), resulting in a 90 percent by weight yield of a resin having an iodine number around 60 and a Barrett color between about 1½ and 3. Substantially any other strong mineral acid, such as phosphoric acid, hydrogen fluoride, and the like, can also be used for this purpose. Any suspended acid can be removed from the resin by washing with caustic or ammonium hydroxide, by filtration through soda lime, or by filtration through clay or other adsorbent solid. Suitable adsorptive solids include bauxite, silica gel, magnesium silicate, kieselguhr, infusorial earth, diatomaceous earth, and various clays, such as fullers earth and bentonite, which contain predominantly aluminum silicates. Among the more commonly used clays are Attapulgus clay and the Florida earths, known by various names such as "Floridin" and "Florex." Clay filtering after acid treatment is not only an effective method of removing the suspended acid, with an excellent clay life of over 50 barrels of resin per ton of clay, but it also produces an additional degree of decolorization. Clay filtering alone, without prior acid treatment, has also been found to be an effective method for color improvement, resulting in a 3½ to 4 Barrett color at a clay life of 20 barrels of resin per ton of clay. My preferred decolorization technique includes a light acid treat of 6 to 10 pounds of 95 percent sulfuric acid per barrel of resin, followed by removing the suspended acid by either caustic washing or clay filtering prior to stripping. A 90 percent by weight yield of light-colored resin, based on the crude resin, results from this simple operation.

My new process broadly comprises the following steps: Dripolene or a fraction thereof is charged into an evacuated or gas-blanketed pressure-type reactor. $BF_3$ (0.5 to 5 percent by weight, preferably 0.5 to 2 percent) is slowly introduced into the reaction zone while the reaction mixture is thoroughly agitated by suitable means. The addition rate is regulated so that the temperature does not exceed 120° F. during the catalyst addition. After all of the $BF_3$ has been added, the mixture is heated rapidly with vigorous agitation to a temperature of about 500 to 650° F., where it is maintained for about 0.1 to 10 hours, preferably 0.25 to 1 hour. At the end of this time, the $BF_3$ is flashed off at a temperature between about 500 and 650° F. and is compressed for reuse. The resulting resin, ordinarily having a Barrett color of about 6 to 10, is agitated at ordinary temperatures with about 5 to 15 pounds per barrel of 95 percent sulfuric acid. The acid sludge is settled and withdrawn, and the treated resin is contacted with Attapulgus clay or other adsorptive solid to a clay life of about 25 to 50 barrels per ton. The treated resin is stripped with a gaseous hydrocarbon or other inert gas to a ring-and-ball softening point of about 150 to 250° F. A purified resin is obtained thereby, having a Barrett color lighter than about 5, an iodine number less than about 80 (ordinarily between about 30 and 50), and excellent resistance to deterioration in color and mechanical structure with age.

In a highly advantageous modification of my process, the charging stock is subjected to a preliminary heat treatment at a temperature between about 500 and 650° F. in the absence of a catalyst. Thereafter, it is cooled below 500° F., preferably to ordinary temperatures, boron trifluoride is commingled therewith while the temperature is held below about 120° F., and the mixture is heated and polymerized as described hereinabove. A resin of lighter color is obtained directly from the reaction vessel, and after being decolorized it is somewhat lighter than the resins obtained in other embodiments of my process.

An essential feature of my invention is the polymerization temperature, which should lie between about 500 and 650° F., preferably around 550° F., varying inversely as a function of the $BF_3$ concentration; for example, at a $BF_3$ concentration of 4 percent by weight, the optimum polymerization temperature lies between about 500 and 525° F., and at a $BF_3$ concentration of 0.5 percent by weight, the optimum lies between about 625 and 650° F. Under these conditions, resins are produced which are highly susceptible to decolorization, whereas resins produced from Dripolene under other conditions are relatively unresponsive to the conventional methods of color reduction.

Another important feature of my invention is the step of hot-flashing $BF_3$ from the polymerized charging stock at a temperature within the polymerization range. If the polymerization mixture is cooled before removal of the $BF_3$, the susceptibility of the resin to decolorization is materially reduced.

Water and oxygenated organic compounds have a detrimental influence in my process, and should therefore be removed and/or excluded substantially completely from the charging stock and other process materials. To remove these substances, surface-active adsorptive solids such as silica gel and aluminum oxide are unsuitable; such materials catalyze exothermic reactions in my charging stock, and lead to the production of undesirably dark resins. The charging stock and other process materials can conveniently be dried and purified by passage through a bed of calcium chloride, anhydrous sodium sulfate, soda lime, or other dehydrating solids which have no appreciable polymerizing effect upon the unsaturated components thereof.

For the same reason, complexes of boron trifluoride with organic oxygenated compounds are not desirable as catalysts in my process, although they have been widely used as catalysts in other polymerization processes. I prefer to use boron trifluoride alone, but it will be understood that the catalyst can be permitted to include inert ingredients. The catalyst is preferably introduced as a gasiform stream into the polymerization zone with vigorous agitation in order to minimize the occurrence of local transient zones of high catalyst concentration therein.

The polymerization can optionally be carried out in an inert solvent for the final resin, such as a light petroleum naphtha, benzene, toluene, xylene, isooctane, gasoline, or other aromatic or aliphatic hydrocarbon or mixture thereof. The presence of such a solvent is especially desirable during the decolorization step or steps, since the polymerization product is ordinarily so viscous that it cannot be satisfactorily contacted in undiluted form with the decolorizing agent. The solvent is conveniently employed in a ratio between about 0.25 and 5 volumes per volume of charging stock. The greater part of the solvent can readily be removed from the polymerization product by distillation, the residual portion being removed in the final stripping of the resin.

The products of my invention are resins of iodine number below about 80, ordinarily between about 30 and 50, of color lighter than about 5 Barrett, ordinarily about 3 or lighter, of excellent color and mechanical stability, and having a ball-and-ring softening point between about 150 and 250° F. These resins are especially well adapted as components of mastic floor tiles, as components of oleoresinous varnishes either alone or in admixture with ture. At the end of the desired reaction time, the bomb was depressured at the polymerization temperature to release the boron trifluoride therefrom, and the product was unloaded and weighed. The product was then dissolved in natural gasoline (200 grams per liter), and the solution was treated successively with 95 percent sulfuric acid and Attapulgus clay according to conventional procedures. Finally, the treated solution was stripped to yield a resin having a ring-and-ball softening point of approximately 210° F. The results of the tests were as follows:

| Polym. Temp., °F. | $BF_3$, wt. percent | Polym. Time, hr. | Acid Treat, lb./bbl. | Clay Life, bbl./T. | Resin Yield, wt. percent | Resin $I_2$ No. | Resin Color (Barrett) | |
|---|---|---|---|---|---|---|---|---|
| | | | | | | | Untreated | Treated |
| 250 | 1.4 | 3 | (1) | (1) | 33.8 | 88 | 13 | |
| 250 | 4 | 3 | (1) | (1) | 33.0 | 52 | 13 | |
| 550 | 0.23 | 3 | 12 | 50 | 20.8 | 94 | 13 | 8 |
| 550 | 0.50 | 3 | 12 | 50 | 32.1 | 61 | 9.5 | 3.5 |
| 500 | 1.00 | 3 | 12 | 25 | 32.0 | 42 | 9 | 2 |
| 550 | 2.00 | 3 | 5.85 | 50 | 32.4 | 34 | 5-6 | 3 |
| 550 | 2.30 | 3 | 5.85 | 50 | 29.1 | | 6 | 3.5 |
| 550 | 3.00 | 3.5 | 5.85 | 50 | 27.6 | 34 | 4.5-5 | 3.5 |

[1] Insoluble in gasoline.

other varnish resins, as plasticizers and softeners for natural or synthetic rubber, and as extenders for rubber, ethyl cellulose, and ester gum in typical adhesives based thereon. Other uses will be apparent to those skilled in the art.

A useful by-product of my process is an aromatic oil of intermediate boiling range (400 to 700° F.). This material is produced in a yield of 5 to 10 percent, based on the charging stock, and the yield can be increased to between 10 and 15 percent if additional aromatic hydrocarbons are incorporated in the reaction mixture. Suitable aromatics for this purpose include benzene, toluene, xylenes, ethylbenzene, and the like. The yield of resin is not affected appreciably by the incorporation of additional aromatics, but the resulting resin product is substantially more susceptible to acid treatment; the incorporation of additional aromatics is therefore a preferred modification of my process. In a further modification, a portion of the intermediate aromatic oil is recycled to the reaction mixture in order to utilize unreacted olefinic materials in said oil. The intermediate aromatic oil is useful as a plasticizer, a solvent (especially for the resins produced in my process), a diluent, and a raw material for the synthesis of insecticides, higher-boiling plasticizers, and other more complex organic compounds.

My invention will be more fully understood from the following specific examples.

*Example I*

A series of tests were carried out to compare the low-temperature and high-temperature $BF_3$ polymerization of a 0-80 volume-percent distillate fraction of "Dripolene," as fully described hereinabove. In each test, 1000 grams of the charging stock were introduced into a 2000-milliliter monel shaking bomb. The desired quantity of boron trifluoride was then added, and the bomb was sealed and heated to the desired polymerization tempera- The beneficial effect of polymerizing at 500-550° F. as compared with 250° F. is apparent from the foregoing data. The resins produced at 250° F. were found to be incompatible with natural gasoline, and therefore could not be acid or clay treated, whereas the resins produced at 500 and 550° F. in the presence of at least 0.5 weight-percent $BF_3$ were highly susceptible to decolorization by acid and clay treatment.

*Example II*

A group of experiments were carried out on the $BF_3$ polymerization of total Dripolene and a number of Dripolene distillate fractions at 550° F. according to the procedure set forth in Example I. The acid-treating step was carried out with 5.85 pounds of 95 percent $H_2SO_4$ per barrel of resin, and the clay-treating step was carried out to a clay life of 50 barrels of resin per ton. The results were as follows:

| Dripolene Fraction, vol. percent | $BF_3$ wt. percent | Reaction Time, hr. | Resin Yield, wt. percent | Resin $I_2$ No. | Resin Color (Barrett) | |
|---|---|---|---|---|---|---|
| | | | | | Untreated | Treated |
| 0-14.4 | 4.0 | 3.0 | 49.2 | 62 | 7-8 | 3½ |
| 0-78.6 | 2.0 | 2.0 | 22.5 | 36 | 4-5 | 3-3½ |
| 0-80 | 2.0 | 3.0 | 28.8 | 46 | 5 | 3½ |
| 0-80 | 2.0 | 14 | 25.3 | 39 | 6-7 | 3½ |
| 0-80 | 3.0 | 3.0 | 28.2 | 40 | 6 | 3½ |
| 0-80 | 4.0 | 3.0 | 27.5 | 42 | 5-6 | 3 |
| Total | 2.0 | 2.5 | 34.6 | 40 | 6 | 3½-4 |
| Total | 1.5 | 3.0 | 35.2 | 62 | 8 | 4 |

It was found that recoveries of 93 to 96 percent were consistently obtained from the combined acid and clay-treating operations. In all cases, light-colored resins of satisfactory quality were obtained.

*Example III*

Two tests were made to compare high temperatures with low temperatures in the separation of $BF_3$ from the polymerization product. In one test, a 0-80 volume-percent Dripolene distillate fraction was heated for three hours at 550° F. with 1.8 percent by weight of $BF_3$ in a 316 stainless-steel rocking-type reactor. The $BF_3$ was flashed off at 550° F. immediately thereafter, and the resin was cooled, unloaded, dissolved in natural gasoline in the proportion of 200 grams per liter, treated with 6 pounds of 96 percent $H_2SO_4$ per barrel of resin, contacted with Attapulgus clay to a clay life of 50 barrels per ton, and stripped to a softening point of approximately 210°

F. The resin was found to have a Barrett color of 7 before acid and clay treatment, and 4½ after treatment.

The above test was substantially duplicated, employing 1.9 percent by weight BF₃, except that the reactor was cooled to room temperature before the BF₃ was removed from the polymerization product. The resulting resin had a Barrett color of 9 before acid and clay treatment, and the treatments reduced the color to only 7.

From the foregoing tests, it appears that the "hot flashing" of the BF₃ from the reaction product is an important feature of my process in order to obtain resins which can be acid and/or clay treated to a low color level. Furthermore, I have noted that hot flashing eliminates the formation of insoluble residues and BF₃ complexes. The observed effect is most pronounced at low concentrations of BF₃ (that is, below about 3 percent by weight).

*Example IV*

A series of tests were carried out to study the effect of thermally pretreating the charging stock prior to addition of BF₃. In each test, total Dripolene or a 0–80 volume-percent Dripolene distillate fraction was charged into a reaction vessel and heated without catalyst to a temperature within the range of 250 to 550° F., from two to three hours being required to reach the desired temperature, and was held at the chosen temperature for a period from 0 to 6 hours. Subsequently, the reaction vessel was cooled to room temperature, BF₃ was added at a temperature below 120° F., and the mixture was heated to 550° F. for a period of 15 minutes. The BF₃ was then flashed from the reaction product at the polymerization temperature, and the product was cooled, unloaded, dissolved in natural gasoline in the proportion of 200 grams per liter, treated with 6 pounds of 95 percent H₂SO₄ per barrel of resin, treated with Attapulgus clay to a clay life of 50 barrels of resin per ton, and stripped to a ball-and-ring softening point of approximately 210° F. The results were as follows:

| Charge | Preheat | | BF₃, wt. percent | Resin Yield, wt. percent | Iodine No. | Color (Barrett) | |
|---|---|---|---|---|---|---|---|
| | Temp., °F. | Time, hr. | | | | Untreated | Treated |
| 0-80% Fraction | 250 | 1 | 2.2 | 31.3 | 34 | 4-5 | 3½ |
| Do | 350 | 1 | 2.3 | 29.2 | ------ | 4+ | 3 |
| Do | 450 | 1 | 2.3 | 28.0 | ------ | 3½ | 2½ |
| Do | 550 | 0 | 2.0 | 27.8 | 44 | 3½ | 2+ |
| Do | 550 | 6 | 2.2 | 26.0 | 35 | 4 | 2½ |
| Total Dripolene | 500 | 0 | 3.0 | 33.8 | ------ | 5-6 | 3 |

From the foregoing tests, it will be seen that preheating the charging stock, preferably to a temperature above about 450° F., prior to the addition of the BF₃ results in a resin of lighter color directly from the reaction vessel, as well as a resin of improved susceptibility to decolorization.

*Example V*

Comparative tests were made to study the effect of the temperature of the charging stock during BF₃ addition. In one test, a mixture of 350 grams of a 0–80 volume-percent Dripolene distillate fraction, 298 grams of toluene, and 52 grams of xylene was charged into a stainless-steel rocking-type reactor. The mixture was cooled to 32° F., and 3.4 percent by weight of BF₃, based on the Dripolene fraction, was added at 32° F. The reaction mixture was then heated to 550° F. for 3 hours, and was subsequently depressured at 550° F. The reaction product was cooled, stripped of low boilers to a softening point of 210° F., dissolved in natural gasoline in the proportion of 200 grams per liter, and treated successively with 6 pounds of 96 percent H₂SO₄ per barrel and with Attapulgus clay to a clay life of 50 barrels per ton. The treated material was stripped to a softening point of approximately 210° F. An 8.3 weight-percent yield of intermediate-boiling aromatic oil and a 36.8 weight-percent yield of resin based on the Dripolene distillate fraction were obtained. The resin had a Barrett color of 5.5 before decolorization and 2.5 after decolorization.

A second test was carried out, duplicating the above test with the exception that 3.3 percent by weight of BF₃ (substantially the same proportion as in the first test) was used as the catalyst, and the BF₃ was added to the reaction mixture without cooling, the temperature thereof being 89° F. at the beginning and 200° F. at the end of the BF₃ addition. The yield of intermediate-boiling aromatic oil was 12.4 weight-percent, and of resin 33.0 weight-percent. The resin had a Barrett color of 5.5 before treatment and 3 after treatment.

The results of the foregoing test indicate that the addition of the BF₃ to the reaction mixture under controlled low-temperature conditions produces a somewhat larger yield of resin having a somewhat greater susceptibility to decolorization by acid treatment.

*Example VI*

Two thermal-pretreat tests were carried out in which portions of a 0–80 volume-percent Dripolene distillate fraction were heated to 550° F. for one hour and were subsequently cooled to 480 and 335° F., at which temperatures BF₃ was injected. The reaction mixtures were then polymerized at 550° F. and further treated as described in Example IV. The results were as follows:

| Temp. of BF₃ Addition, °F. | BF₃, wt. percent | Resin Yield, wt. percent | Iodine No. | Color (Barrett) | |
|---|---|---|---|---|---|
| | | | | Untreated | Treated |
| 335 | 2.6 | 23.3 | 46 | 7 | 3-3½ |
| 480 | 2.3 | 20.7 | 46 | 7 | 3 |

The foregoing data show that a considerably lower yield of a darker colored resin is produced by injecting the BF₃ at temperatures as high as 335° F. This is in line with the previous observation that higher yields of lighter-colored resins are obtained when the BF₃ is injected at temperatures below 120° F.

*Example VII*

A series of tests were run in which a 0–80 volume-percent distillate fraction of Dripolene was polymerized in the presence of added aromatics. In each test, the Dripolene fraction and an 85:15 mixture by volume of toluene and xylenes were charged into a stainless-steel rocking-type reactor and BF₃ was added at low temperature, the reactor being cooled in ice water. The reactor was then heated to 550° F. and held at this temperature for two to three hours, after which the BF₃ was removed by depressuring at 550° F. The reaction product was cooled, stripped of low boilers, dissolved in natural gasoline in the proportion of 200 grams per liter, treated with 6 pounds of 96 percent sulfuric acid per barrel of resin, treated with clay to a clay life of 50 barrels per ton, and stripped to a softening point of approximately 220° F. An aromatic oil having a boiling range of 400 to 700° F. was recovered from the low boilers, and was recycled in three of the tests. Two control runs were also made on the Dripolene fraction without added aromatics. The results were as follows:

| Charge | Parts by wt. | BF₃, wt. percent | Oil Yield, wt. percent | Resin Yield, wt. percent | Resin Color (Barrett) Untreated | Resin Color (Barrett) Treated |
|---|---|---|---|---|---|---|
| 0–80 vol. percent Dripolene | | 3.7 | 3.3 | 37.7 | 6½ | 4 |
| Do | 350 | 3.4 | 9.4 | 35.7 | 5½ | 2 |
| Toluene | 298 | | | | | |
| Xylene | 52 | | | | | |
| 0–80 vol. percent Dripolene | 350 | 3.1 | 13.1 | 33.2 | 6 | 3 |
| Toluene | 298 | | | | | |
| Xylene | 52 | | | | | |
| 0–80 vol. percent Dripolene | 350 | 3.1 | 18.5 | 33.6 | 7 | 2 |
| Recycle oil | 29 | | | | | |
| Toluene | 273 | | | | | |
| Xylene | 48 | | | | | |
| 0–80 vol. percent Dripolene | 350 | 2.6 | 21.8 | 31.6 | 8 | 3 |
| Recycle oil | 60 | | | | | |
| Toluene | 247 | | | | | |
| Xylene | 43 | | | | | |
| 0.80 vol. percent Dripolene | 350 | 5.4 | 20.9 | 35.9 | 6½ | 3 |
| Recycle oil | 60 | | | | | |
| Toluene | 247 | | | | | |
| Xylene | 43 | | | | | |
| 0–80 vol. percent Dripolene | | ¹ 3.5 | 10.0 | 29.2 | 6–7 | 4 |

¹ No cooling during addition of BF₃.

From the foregoing data, it can be concluded that the yield of resin is not substantially affected by the addition of aromatics to the charging stock or by the recycle of the aromatic oil. The yield of aromatic oil, however, does appear to be increased somewhat by the addition of aromatics.

While I have described the process of my invention in connection with certain specific embodiments thereof, and have illustrated my invention with examples employing certain specific charging stocks and operating conditions, it is to be understood that I am not limited thereto, but may practice my invention in accordance with the broad disclosure thereof. It is further to be understood that any modifications or equivalents that would ordinarily occur to one skilled in the art are to be considered as lying within the scope of my invention.

In accordance with the foregoing description, I claim as my invention:

1. A process for making a resin from a normally liquid mixture of unsaturated hydrocarbons obtained in the pyrolysis of a normally gaseous hydrocarbon having at least two carbon atoms in the molecule at a temperature between about 1300 and 1550° F. and a contact time between about 0.2 and 5 seconds, which comprises contacting said normally liquid mixture of unsaturated hydrocarbons with above about 0.5 percent by weight of boron trifluoride in the substantial absence of water and organic oxygenated compounds at a temperature above about 500° F., whereby a portion of said unsaturated hydrocarbons is converted into a thermoplastic resin, removing said boron trifluoride from the reaction product at a temperature above about 500° F., and removing low-boiling components from the reaction product, whereby a thermoplastic resin is obtained having an iodine number below about 80, light color, and superior susceptibility to decolorization.

2. A process for making a resin from a normally liquid mixture of unsaturated hydrocarbons obtained in the pyrolysis of a normally gaseous hydrocarbon having at least two carbon atoms in the molecule at a temperature between about 1300 and 1550° F., and a contact time between about 0.2 and 5 seconds, which comprises contacting said normally liquid mixture of unsaturated hydrocarbons with above about 0.5 percent by weight of boron trifluoride in the substantial absence of water and organic oxygenated compounds at a temperature above about 500° F., whereby a portion of said unsaturated hydrocarbons is converted into a thermoplastic resin, removing said boron trifluoride from the reaction product at a temperature above about 500° F., contacting the reaction product with a decolorizing agent selected from the group consisting of adsorbent solids and strong mineral acids, separating said decolorizing agent, and removing low-boiling components from the reaction product, whereby a thermoplastic resin is obtained having an iodine number below about 80 and a Barrett color lighter than about 5.

3. A process for making a resin from a normally liquid mixture of unsaturated hydrocarbons obtained in the pyrolysis of a normally gaseous hydrocarbon having at least two carbon atoms in the molecule at a temperature between about 1300 and 1550° F., and a contact time between about 0.2 and 5 seconds, which comprises separating a distillate fraction from said normally liquid mixture of unsaturated hydrocarbons, contacting said distillate fraction with between about 0.5 and 5 percent by weight of boron trifluoride in the substantial absence of water and oxygenated organic compounds at a temperature above about 500° F., whereby a portion of said distillate fraction is converted into a thermoplastic resin, flashing said boron trifluoride from the reaction product at a temperature above about 500° F., cooling the reaction product, contacting the reaction product at ordinary temperatures with concentrated sulfuric acid, separating the resulting acid sludge and entrained acid therefrom, and stripping the treated reaction product to a ball-and-ring softening point between about 150 and 250° F., whereby a thermoplastic hydrocarbon resin is obtained having an iodine number below about 80 and a Barrett color lighter than about 5.

4. A process for making a resin from a normally liquid mixture of unsaturated hydrocarbons obtained in the pyrolysis of a normally gaseous hydrocarbon having at least two carbon atoms in the molecule at a temperature between about 1300 and 1550° F., and a contact time between about 0.2 and 5 seconds, which comprises separating a 0–80 volume percent distillate fraction from said normally liquid mixture of unsaturated hydrocarbons, contacting said distillate fraction with between about 0.5 and 5 percent by weight of boron trifluoride in the substantial absence of water and oxygenated organic compounds at a temperature between about 500 and 650° F., whereby a portion of said distillate fraction is converted into a thermoplastic resin, flashing said boron trifluoride from the reaction product at a temperature between about 500 and 650° F., cooling the reaction product, contacting the reaction product at ordinary temperatures with concentrated sulfuric acid, separating the resulting acid sludge and entrained acid therefrom, and stripping the treated reaction product to a ball-and-ring softening point between about 150 and 250° F., whereby a thermoplastic hydrocarbon resin is obtained having an iodine number between about 30 and 50 and a Barrett color lighter than about 5.

5. A process for making a resin from a normally liquid mixture of unsaturated hydrocarbons obtained in the pyrolysis of a normally gaseous hydrocarbon having at least two carbon atoms in the molecule at a temperature above about 1300° F. and below about 1550° F. and a contact time between about 0.2 and 5 seconds, which comprises heating said normally liquid mixture of unsaturated hydrocarbons to a temperature above about 450° F., adding to said hydrocarbons above about 0.5 percent by weight of boron trifluoride, heating the resulting mixture in the substantial absence of water and organic oxygenated compounds at a temperature above about 500° F., whereby a portion of said unsaturated hydrocarbons is converted into a thermoplastic resin having an iodine number below about 80 and superior susceptibility to decolorization, removing said boron trifluoride from the reaction product at a temperature above about 500° F., and recovering said resin from the reaction product.

6. A process for making a resin and a high-boiling aromatic oil from a normally liquid mixture of unsaturated hydrocarbons obtained in the pyrolysis of a normally gaseous hydrocarbon having at least two carbon atoms in the molecule at a temperature above about 1300° F. and below about 1550° F. and a contact time between about 0.2 and 5 seconds, which comprises commingling said normally liquid mixture of unsaturated hydrocarbons with an aromatic hydrocarbon and above about 0.5 percent by weight of boron trifluoride, heating the resulting mixture in the substantial absence of water and organic oxygenated compounds at a temperature above about 500° F., whereby a portion of said unsaturated hydrocarbons is converted into a thermoplastic resin having an iodine number below about 80 and superior susceptibility to decolorization, and whereby a portion of said aromatic hydrocarbon is converted into an aromatic oil boiling between about 400 and 700° F., removing said boron trifluoride from the reaction product at a temperature above about 500° F., and separately recovering said resin and said aromatic oil from the reaction product.

7. A process for making a resin from a normally liquid mixture of unsaturated hydrocarbons obtained in the pyrolysis of a normally gaseous hydrocarbon having at least two carbon atoms in the molecule at a temperature above about 1300° F. and below about 1550° F. and a contact time between about 0.2 and 5 seconds, which comprises separating a 0–80 volume percent distillate fraction from said normally liquid mixture of unsaturated hydrocarbons, adding between about 0.5 and 5 percent by weight of boron trifluoride to said distillate fraction at a temperature below about 120° F., heating the resulting mixture in the substantial absence of water and oxygenated organic compounds at a temperature between about 500 and 650° F., whereby a portion of said distillate fraction is converted into a resin of low iodine number, light color, and superior susceptibility to decolorization, flashing said boron trifluoride from the reaction product at a temperature between about 500 and 650° F., cooling the reaction product, contacting the reaction product at ordinary temperatures with concentrated sulfuric acid, separating the resulting acid sludge and entrained acid therefrom, and stripping the treated reaction product to a ball-and-ring softening point between about 150 and 250° F., whereby a hydrocarbon resin is obtained having an iodine number between about 30 and 50 and a Barrett color lighter than about 5.

References Cited in the file of this patent

UNITED STATES PATENTS

| | | |
|---|---|---|
| 2,039,364 | Thomas | May 5, 1936 |
| 2,161,599 | Towne | June 6, 1939 |
| 2,521,022 | Rowland | Sept. 5, 1950 |
| 2,559,498 | Garber | July 3, 1951 |

OTHER REFERENCES

Groll: "Vapor-Phase Cracking," Ind. Eng. Chem., 25, 784–798 (only pages 788 and 789 relied on), July 1933.